(12) United States Patent
Zaetterqvist et al.

(10) Patent No.: US 10,486,813 B2
(45) Date of Patent: Nov. 26, 2019

(54) DISPENSER WITH A COVER AND A METHOD FOR LAUNCHING COUNTERMEASURES

(71) Applicant: SAAB AB, Linkoeping (SE)

(72) Inventors: Christer Zaetterqvist, Uppsala (SE); Knut Olof Joensson, Nacka (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/301,595

(22) PCT Filed: May 5, 2017

(86) PCT No.: PCT/SE2017/050439
§ 371 (c)(1),
(2) Date: Nov. 14, 2018

(87) PCT Pub. No.: WO2017/200457
PCT Pub. Date: Nov. 23, 2017

(65) Prior Publication Data
US 2019/0283878 A1  Sep. 19, 2019

(30) Foreign Application Priority Data

May 17, 2016 (SE) ...................... 1650666

(51) Int. Cl.
*B64D 7/00* (2006.01)
*B64D 1/02* (2006.01)
(Continued)

(52) U.S. Cl.
CPC ................. *B64D 7/00* (2013.01); *B64D 1/02* (2013.01); *F42B 5/15* (2013.01); *F42B 12/70* (2013.01); *F41F 1/08* (2013.01)

(58) Field of Classification Search
CPC ... F42B 12/70; F42B 5/15; B64D 1/02; B64D 1/04; B64D 1/08; B64D 7/00
(Continued)

(56) References Cited

U.S. PATENT DOCUMENTS 3,511,457 A * 5/1970 Pogue ...................... B64D 1/02
244/137.3
3,517,584 A * 6/1970 Robinson ................. B64D 1/02
89/1.51
(Continued)

FOREIGN PATENT DOCUMENTS

| EP | 0253028 B1 | 8/1990 |
| EP | 1194331 B1 | 5/2004 |
| EP | 2421754 B1 | 10/2016 |

OTHER PUBLICATIONS

International Searching Authority, International Search Report and Written Opinion for International Application No. PCT/SE2017/050439, dated Jul. 26, 2017, 12 pages, Swedish Patent and Registration Office, Sweden.

*Primary Examiner* — Joshua E Freeman
(74) *Attorney, Agent, or Firm* — Alston & Bird LLP

(57) ABSTRACT

A dispenser for storing and launching countermeasures from an aircraft, comprising an elongate body provided with at least one launch opening adapted for storing the countermeasures in cartridges, where the dispenser comprises a pivot able cover arranged in the launch opening, where the cover, in a closed state, is adapted to close the launch opening such that the cartridges are covered. The cover is adapted to open when a force from a fired countermeasure is acting on a mounting plate. The advantage of the invention is that a cover covering the countermeasure scan be opened in a fully mechanical way, by the use of the reactional force of the countermeasure. This allows for a simple, reliable and cost-effective solution.

15 Claims, 3 Drawing Sheets

(51) Int. Cl.
*F42B 12/70* (2006.01)
*F42B 5/15* (2006.01)
*F41F 1/08* (2006.01)

(58) Field of Classification Search
USPC .......................................................... 89/1.51
See application file for complete search history.

(56) References Cited

U.S. PATENT DOCUMENTS

| | | | | |
|---|---|---|---|---|
| 3,547,000 A * | 12/1970 | Haberkorn | ............... | B64D 1/02 89/1.51 |
| 4,962,798 A * | 10/1990 | Ferraro | .................... | B64D 1/02 221/153 |
| 6,619,178 B1 * | 9/2003 | Fransson | ................. | B64D 1/02 244/137.1 |
| 6,929,214 B2 * | 8/2005 | Ackleson | ................ | B64D 7/00 244/1 R |
| 8,490,924 B2 * | 7/2013 | Zachrisson | ............. | B64D 7/00 102/505 |
| 8,549,976 B2 * | 10/2013 | Zatterqvist | .............. | B64D 7/00 89/1.51 |
| 8,720,829 B2 * | 5/2014 | Zatterqvist | .............. | B64D 7/00 244/137.1 |
| 2003/0121404 A1 * | 7/2003 | O'Dwyer | ................ | B64D 1/04 89/1.41 |
| 2005/0204910 A1 * | 9/2005 | Padan | ..................... | B64D 1/04 89/1.813 |
| 2011/0155856 A1 * | 6/2011 | Zachrisson | ............. | B64D 7/00 244/136 |
| 2012/0104174 A1 * | 5/2012 | Zatterqvist | .............. | B64D 7/00 244/137.1 |
| 2012/0118212 A1 | 5/2012 | Travis | | |
| 2012/0125183 A1 * | 5/2012 | Zatterqvist | .............. | B64D 7/00 89/1.51 |
| 2013/0167711 A1 * | 7/2013 | Zatterqvist | .............. | B64D 1/02 89/1.56 |
| 2016/0127996 A1 | 5/2016 | Patil et al. | | |

\* cited by examiner

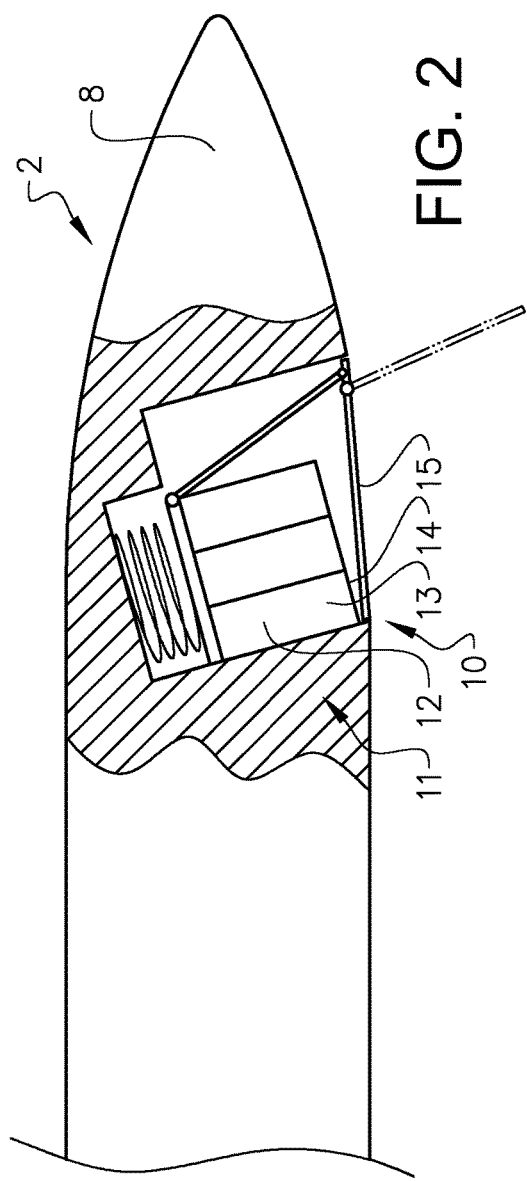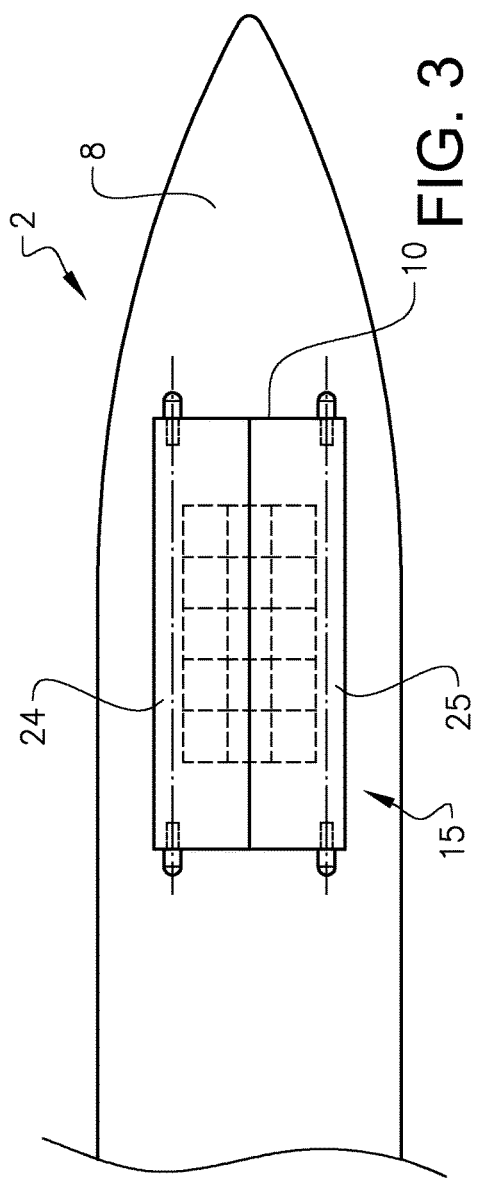

DISPENSER WITH A COVER AND A METHOD FOR LAUNCHING COUNTERMEASURES

CROSS REFERENCE TO RELATED APPLICATIONS

This application is a National Stage Application, filed under 35 U.S.C. § 371, of International Application No. PCT/SE2017/050439, filed May 5, 2017, which claims priority to Swedish Application No. 1650666-9, filed May 17, 2016; the contents of both of which are hereby incorporated by reference in their entireties.

BACKGROUND

Related Field

The present invention relates to a dispenser for storing and launching countermeasures, such as flares and chaff, comprising a cover operated by passive means.

Description of Related Art

Arrangements for storing and launching payloads, such as countermeasures, which are designed to be mounted on aircrafts, are previously known. Such arrangements comprise an elongate body provided with at least one launch opening. The shape of the arrangement may have other equivalent shapes, such as an elliptic or circular shape. However, an elongate body is an efficient shape. Such arrangements are mounted with the longitudinal direction of the elongate body essentially coinciding with the flight direction of the aircraft. The countermeasures are connected to a firing control unit for feeding firing signals to the countermeasures. The countermeasures can consist of passive means, such as chaff foil, but can also consist of for example IR flares, or other active measures. The countermeasures are stored in a magazine in the arrangement, comprising a plurality of cartridges, with one countermeasure in each cartridge.

One problem with known arrangements is that unfavourable acoustic phenomenon, such as extremely high air induced noise and vibration levels, are generated due to the open cavities of the cartridges holding the countermeasures, after firing of the countermeasures. The relative wind speed, due to the speed of the aircraft, interacts with the opening of an empty cartridge in which a countermeasure has been stored. The open cavity may act as barrels which oscillate at its natural inherent frequency. This acoustic noise can be localised by human ear and may also cause damage on the equipment, such as electric components, due to the strong vibrations created. The longitudinal extension and the number of openings of the cartridges in the elongated body can be rather large. The angle of a cartridge relative the travelling direction of the aircraft will also affect the induction of acoustic noise.

A further problem with open cavities of the cartridges is that an open cavity will create a higher Radar Cross Section (RCS) than a closed cavity, due to corner reflections in the cavity. A higher number of open cavities will thus create a higher RCS.

It is known to arrange a vortex generating means in front of a launch opening, which is adapted to disturb and distribute the wind flow over the magazine in order to reduce the induced noise. However, the effect of such a vortex generating means decreases with the increasing length of the launch opening, since the air flow will be more laminar farther away from the vortex generating means, i.e. the air flow may be relatively laminar at the rear of a longer opening.

Further, such a vortex generating means will generate turbulent flows that are difficult to control and that will result in high energy losses. Such a solution may also contribute to an increased extension of the design of the arrangement in the longitudinal extension of the elongated body.

A further problem with such an arrangement is that the arrangement is sensitive for influence of the air flow depending e.g. on the speed of the aircraft and of the position of the elongated body. This solution will further not reduce the RCS created by the open cavities.

An example of a previously known arrangement described as a dispenser which is used for launching countermeasures and which is provided with several compartments, is described in document EP 1194331 B1. An elongated body of the dispenser is provided with fixed means, described as a spoiler, in front of each compartment for acting on the air stream and for creating a low dynamic pressure across the compartment openings.

From document EP 0253028 B1, it is known to provide the exterior surface of an aircraft with a pair of vortex generators arranged right in front of an inlet opening in order to increase the mass airflow into the inlet.

These solutions will reduce the acoustic noise induced by an open cavity. They will however not decrease the created RCS. It is known to arrange an actively controlled hatch in the body of an aircraft. The hatch is activated by electric or hydraulic actuators, and is controlled by electronic circuits and software, and comprises safety switches and other sensors. This is a rather complicated and costly solution, and is not optimally adapted to be used as an integral part of dispenser design and construction.

From US 2016/0127996 A1, a method for managing an airflow of an aircraft is known. The aircraft is provided with a weapons bay which is opened by doors. A spoiler consisting of a frame and louvers is moved into the airflow in order to create a controlled laminar air flow passing the bay of the aircraft when the bay is open. The doors, the spoiler and the louvers are operated by various actuators and motors.

These arrangements may give an acceptable result in some cases. However, there is room for improvements.

BRIEF SUMMARY

One object of the present invention is to at least partially eliminate the drawbacks associated with the solutions known in the prior art. Another object is to minimise the occurrence of acoustic phenomenon which are caused by the openings in cavities which have been emptied of payloads, such as countermeasures. A further object of the invention is to provide a dispenser that will reduce the created RCS. Another object of the invention is to provide an aircraft comprising such a dispenser.

The solution to the problem according to the invention is described in the characterizing part of claim 1. Claim 13 contains an advantageous method for launching a countermeasure. The other claims contain advantageous embodiments and further developments of the dispenser and the method.

In a dispenser for storing and launching countermeasures, comprising an elongate body provided with at least one launch opening adapted for storing the countermeasures in cartridges, where the dispenser comprises a plurality of cartridges mounted to a base plate, where the dispenser is adapted to be mounted on an aircraft with the longitudinal direction of the elongate body essentially coinciding with the direction of motion of the aircraft, the object of the invention is achieved in that the dispenser comprises a cover arranged in the launch opening, where the cover is pivotally suspended on a hinge, where a first section of the cover is arranged at a first side of the hinge, and that the base plate comprises a mounting plate, a bottom plate and a resilient means arranged between the mounting plate and the bottom plate, where a mechanical connection interconnects the mounting plate with a second section of the cover arranged at a second side of the hinge, and where the cover, in a closed state, is adapted to close the launch opening such that the cartridges are covered.

By this first embodiment of the dispenser according to the invention, a cover adapted to cover the launch opening of a countermeasure dispenser is provided. The cover is suspended on a hinge such that it will be opened when a countermeasure is fired. The cover is operated by passive means, which makes the inventive solution simple, reliable and cost-effective. The bottom of a cartridge of a countermeasure is mounted on a base plate. The base plate comprises a mounting plate and a bottom plate which is provided with a resilient means arranged between the mounting plate and the bottom plate. When a countermeasure is fired, the reaction force of the countermeasure will act on the mounting plate, which will be forced to move backwards. A mechanical connection, interconnecting the mounting plate with the cover, will pull one end of the cover rearward, which swings the cover open. The cover is suspended with a hinge. When the reactive force from the countermeasure cease to act on the mounting plate, i.e. when the countermeasure has left the cavity, the cover will swing back to a closed state due to the resilient means arranged between the mounting plate and the bottom plate or by a spring arrangement acting on the cover. The resilient means may e.g. be a preloaded spiral spring which forces the mounting plate and the bottom plate apart. With a rigid mechanical connection, such as a push rod, interconnecting the mounting plate with the cover, the cover will be pushed to the closed state by the mechanical connection. With a flexible mechanical connection, such as a wire, a separate spring will close the cover. By the inventive solution, the cartridges will be covered when no countermeasure is to be launched.

One advantage of this is that the openings of empty cavities are covered during normal operation of the aircraft. This will reduce the induced noise which may be created by one or more open cavities during flight. A further advantage is that RCS is reduced. A further advantage with a passively operated cover is that it is simple and robust, and that there is no need to use safety classified software for an electronic control unit or to use various electronic safety circuits. By integrating the cover with the magazine holding the cartridges, a self-contained cover solution is obtained, which can be mounted in any dispenser having a launch opening without further modification. Thus, also dispensers not previously provided with a cover can be equipped with a cover solution. A further advantage of the present solution is that the resilient means reduces the need for a rigid structure on the aircraft side or wing, since the resilient means will reduce the impact from the firing of a countermeasure on the aircraft structure.

In one example, a single cover is used to cover the launch opening. In this example, the hinge of the cover is preferably arranged perpendicular to the travelling direction of the aircraft, at the front of the launch opening. In this way, the cover will open against the air flow created by the aircraft. The airflow will in this case help to close the cover when a countermeasure has been launched. It is also possible to arrange the hinge of the cover at the aft of the launch opening, even though this will require a greater closing force for the cover. In another example, the cover comprises a first cover and a second cover. In this case, the first cover and the second cover are preferably two longitudinal covers arranged with the hinges on each side of the magazine, with the hinges parallel to the travelling direction of the aircraft. The covers may in this case be somewhat inclined such that the airflow will help to close the covers when a countermeasure has been launched. It is also possible to arrange the hinges for the first cover and the second cover at the front and at the aft of the opening. In this case, the forward cover may be larger than the rearward cover.

BRIEF DESCRIPTION OF DRAWINGS

The invention will be described in greater detail in the following, with reference to the embodiments that are shown in the attached drawings, in which FIG. 2 shows a cut side view of a dispenser according to the invention, FIG. 3 shows a bottom view of a dispenser according to the invention.

DETAILED DESCRIPTION OF VARIOUS EMBODIMENTS

The embodiments of the invention with further developments described in the following are to be regarded only as examples and are in no way to limit the scope of the protection provided by the patent claims. References such as longitudinal, horizontal, vertical, right, left, etc. refer to directions of an aircraft flying forwards in a normal orientation.

Figure 1:
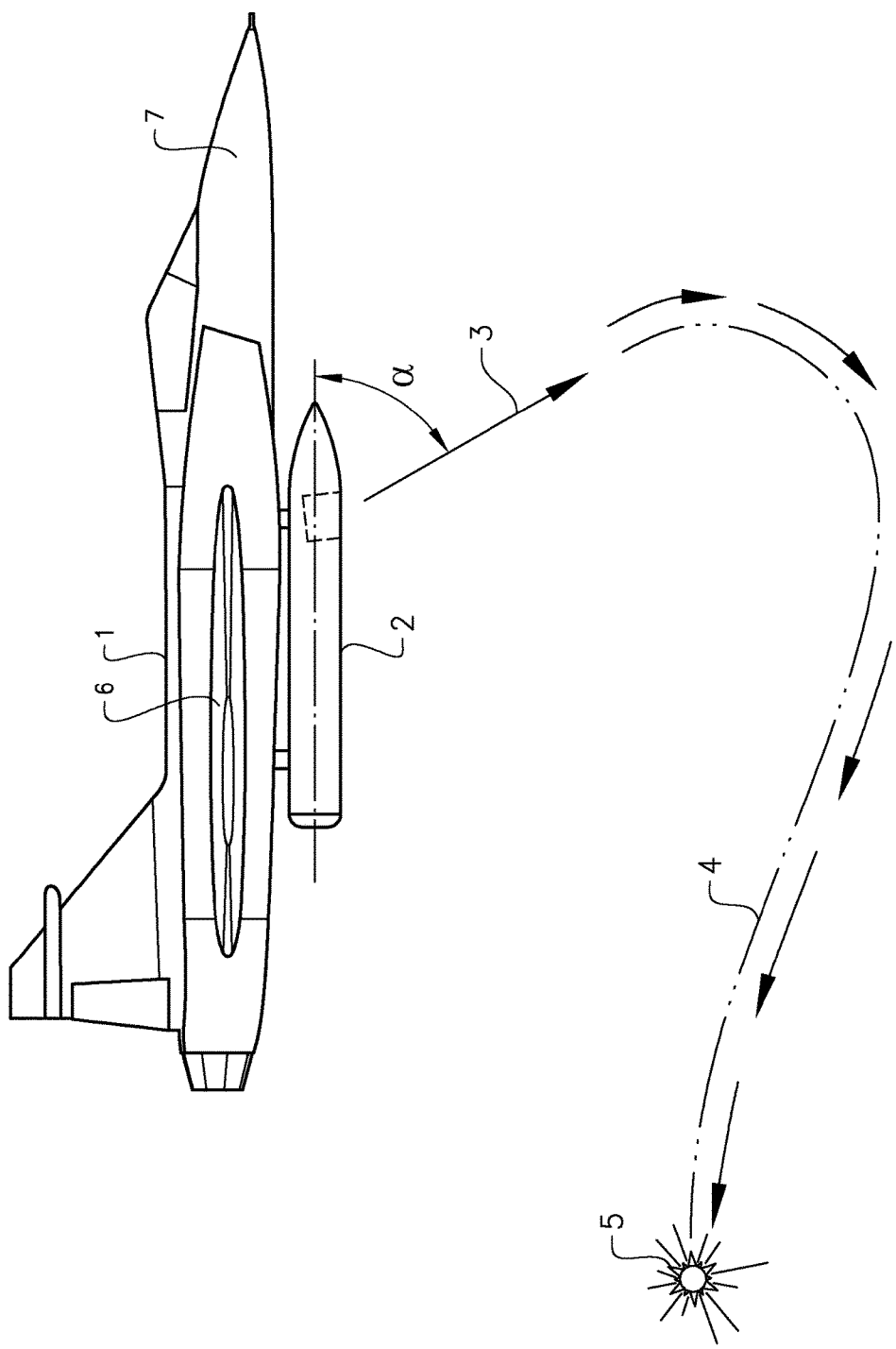
FIG. 1 shows a side view of an aeroplane provided with a dispenser according to an embodiment of the invention for storing and launching countermeasures.

An aircraft 1 shown in FIG. 1 is provided with a dispenser 2 for storing and launching payloads, hereinafter described as countermeasures 5. The dispenser 2 has its longitudinal direction essentially coinciding with the longitudinal direction of the aircraft 1. An arrow 3 designates the direction of launching from the dispenser 2. The character a designates the launch angle relative to the direction of movement of the aircraft 1 when the countermeasures 5 are launched obliquely forwards and downwards The trajectory 4 for a launched flare 5 is indicated by a broken line. During the time from when a flare 5 is activated for launch to when it reaches the position shown in FIG. 1, sufficient time has elapsed for the flare 5 to have become a fully active decoy target in close proximity to the aircraft 1. In the example shown in FIG. 1, the dispenser 2 is placed under a wing 6 near its attachment to the main body 7 of the aircraft 1. It is also possible to place the dispenser 2 further out on the wing 6 or directly on the main body 7 of the aircraft 1, e.g. on top of the aircraft.

The dispenser 2 is described in more detail with reference to FIGS. 2 and 3. The dispenser 2 is designed as an elongate body 8, partially shown in FIG. 2, provided with at least one launch opening 10 used for storing the countermeasures 5 in a magazine 11 comprising a plurality of cartridges 12. A cartridge 12 comprises a cavity 13 adapted to store the countermeasure 5 and is provided with a forward facing opening 14. The countermeasures 5 are connected to a launching control unit (not shown) for feeding launching signals to the countermeasures. The cartridges 12 may be individual cartridges mounted to each other in a replaceable manner to form a magazine such that a cartridge can be replaced when it has been launched. A magazine may also comprise fixed cartridges, where a cavity may be reloaded with a new countermeasure. The cartridges 12 can be of the same size or of different sizes and can accommodate identical or different types of countermeasures 5. In FIG. 2, a magazine comprising three rows of cartridges is shown. In FIG. 3, a magazine comprising five rows of cartridges, with three cartridges in each row, is shown.

In the example shown in FIG. 2, the magazine 11 is inclined forwards such that a forward launch angle is obtained. The inclination angle is chosen depending on the intended use of a countermeasure and may be e.g. between 30° to 60° relative to the aircraft 1. The magazine may also be arranged without an inclination, such that the openings of the cavities are arranged essentially perpendicular relative to the longitudinal direction of the elongate body. In principle, all geometrically possible positions can be considered. An inclined launch angle may be advantageous when a countermeasure is fired downwards from the dispenser, a straight launch angle may be advantageous when launching a countermeasure in a sideway direction from the aircraft.

The magazine 11 is further provided with a cover 15. The cover is arranged in the launch opening 10 and is adapted to cover the magazine when no countermeasure is to be launched. When a countermeasure is launched, the cover is opened such that the countermeasure can exit the cavity. The purpose of the cover is primarily to cover the empty cavity openings in the magazine. An empty cavity opening may create noise vibrations when it is exposed to the air flow created by the flying aircraft. The cover will prevent the creation of these vibrations.

Figure 4:
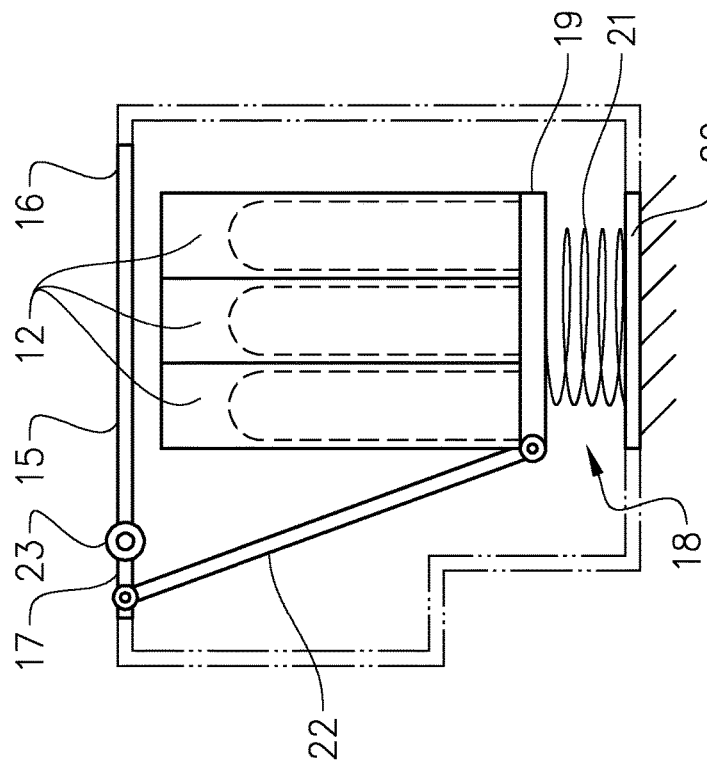
FIG. 4 shows a side view of a magazine to be used in a dispenser according to the invention in a closed state.

The cover, shown in FIG. 4, is provided with a rotational axis around which the cover is opened and closed, rotating on a hinge arrangement 23. The cover shown in FIG. 2 comprises a single part and is provided with a rotational axis perpendicular to the longitudinal direction of the elongate body, and is arranged at the front of the launch opening. The cover will open against the air flow and the air flow will help to close the cover after a countermeasure has been launched. The cover is provided with a first section 16 which constitutes the actual cover and a second section 17 which constitutes a lever used to open the cover. The first section 16 is arranged at a first side of the rotational axis of the cover, i.e. on a first side of the hinge, and the second section 17 is arranged at a second side of the rotational axis, i.e. on a second side of the hinge. It is also possible to arrange the hinge of the cover at the aft of the launch opening, even though this will require a greater closing force for the cover.

The cover 15 shown in FIG. 3 comprises a first cover 24 and a second cover 25 and is provided with the rotational axes in parallel with the longitudinal direction of the elongate body. The first cover and the second cover will here open parallel to the air flow. It is possible to incline the first cover and the second cover some, such that the air flow of the aircraft will help to close the first cover and the second cover when a countermeasure has been launched. It is also possible to arrange the hinges for the first cover at the front and the hinge for the second cover at the aft of the opening. In this case, the forward cover may be larger than the rearward cover. When the cover comprises a first cover and a second cover, the first cover and the second cover may have different dimensions, but the cover will still cover the complete launch opening when the cover is closed.

A magazine 11 with a cover in a closed state is shown in FIG. 4. The magazine 11 comprises a plurality of cartridges 12, which are mounted to a base plate 18. The base plate is adapted to be mounted to the dispenser in a rigid way, e.g. with brackets attached to the inner walls of the dispenser. The base plate 18 comprises a mounting plate 19 and a bottom plate 20 and a resilient means 21 arranged between the mounting plate 19 and the bottom plate 20. In this way, the mounting plate 19 and the bottom plate 20 can move towards each other when a force is applied to the mounting plate. In order to be able to open the cover, a mechanical connection 22 interconnects the mounting plate 19 with the second section 17 of the cover.

Figure 5:
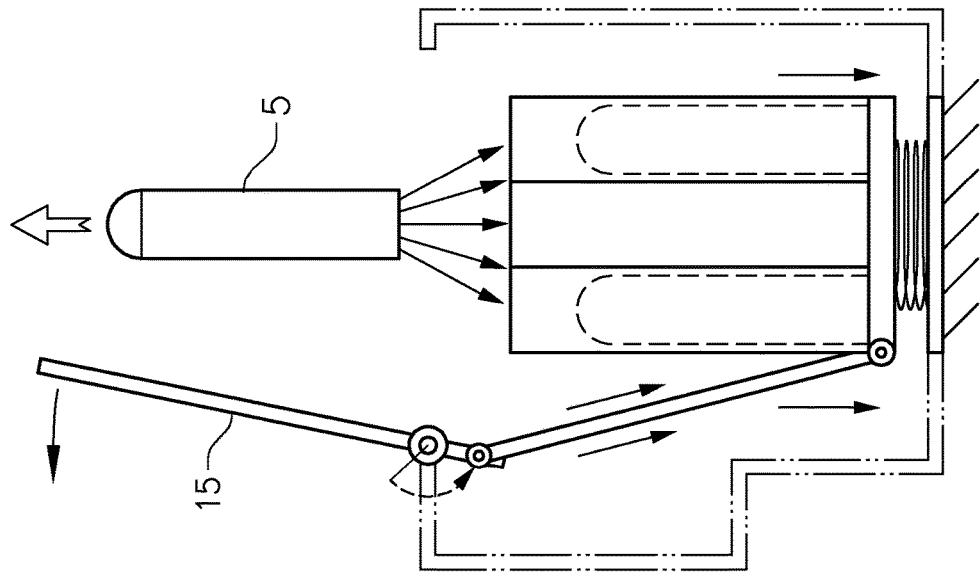
FIG. 5 shows a side view of a magazine to be used in a dispenser according to the invention in an open state.

When a countermeasure is to be launched, a launch signal is sent to the countermeasure. The propellant of the countermeasure is ignited, and the recoil force created by the propellant and the mass of the countermeasure will act on the mounting plate, which is forced backwards, towards the bottom plate. The resilient means will be compressed and the mounting plate will pull the mechanical connection backwards, which in turn pulls the cover open. At the same time, the countermeasure leaves the cavity and exits the magazine and the launch opening, as seen in FIG. 5. The cover is now in an active, open state which allows the countermeasure to exit the magazine without touching the cover. When the countermeasure has left the magazine, the force acting on the mounting plate ceases. The resilient means will spring back which allows the cover to close again.

The cover may be closed in different ways. In the shown example, the mechanical connection is rigid, e.g. in the form of a push/pull rod, such that the cover will be pushed to a closed state by the resilient means acting on the mounting plate, when the mounting plate returns to its original position. The mechanical connection may also be flexible, e.g. a wire, which will be able to open the cover. In this case, a separate spring arranged at the hinge is used to close the cover. Further, the air flow may help to close the cover. The resilient means preferably comprises a coil spring which is compressed during the launching of a countermeasure. The resilient means may further comprise a viscous damper that will dampen the impact from the launched countermeasure. This will reduce the stress from the fired countermeasure on the mounting means that attaches the magazine to the dispenser. A viscous damper can further be used to control the opening properties of the cover, such as the timing of the opening of the cover.

The invention is not to be regarded as being limited to the embodiments described above, a number of additional variants and modifications being possible within the scope of the subsequent patent claims. The cover may have different shapes and sizes and may be made from any suitable material.

REFERENCE SIGNS

1: Aircraft
2: Dispenser
3: Direction of launch
4: Trajectory
5: Countermeasure
6: Wing
7: Main body
8: Elongate body 10: Launch opening
11: Magazine
12: Cartridge
13: Cavity
14: Opening
15: Cover
16: First section of cover
17: Second section of cover
18: Base plate
19: Mounting plate
20: Bottom plate
21: Resilient means
22: Connection
23: Hinge
24: First cover
25: Second cover

The invention claimed is:

1. A dispenser (2) for storing and launching countermeasures (5), comprising an elongate body (8) provided with at least one launch opening (10) adapted for storing the countermeasures (5) in cartridges (12), wherein:
the dispenser comprises a plurality of cartridges (12) mounted to a base plate (18),
the dispenser is adapted to be mounted on an aircraft (1) with the longitudinal direction of the elongate body (8) essentially coinciding with the direction of motion of the aircraft (1),
the dispenser comprises a cover (15) arranged in the launch opening (10),
the cover (15) is pivotally suspended on a hinge (23),
a first section (16) of the cover (15) is arranged at a first side of the hinge (23), and that the base plate (18) comprises a mounting plate (19), a bottom plate (20) and a resilient means (21) arranged between the mounting plate (19) and the bottom plate (20), where
a mechanical connection (22) interconnects the mounting plate (19) with a second section (17) of the cover arranged at a second side of the hinge (23), and
the cover (15), in a closed state, is adapted to close the launch opening (10) such that the cartridges (12) are covered.

2. Dispenser according to claim 1, wherein the cover (15), in an active state, is adapted to open the launch opening (10).

3. Dispenser according to claim 2, wherein the cover (15) is adapted to open when a force from a launched countermeasure is acting on the mounting plate (19).

4. Dispenser according to claim 1, wherein the cover (15) of the dispenser comprises a first cover (24) and a second cover (25).

5. Dispenser according to claim 1, wherein the resilient means (21) comprises a coil spring.

6. Dispenser according to claim 5, wherein the resilient means (21) further comprises a viscous damper.

7. Dispenser according to claim 1, wherein the mechanical connection (22) is rigid.

8. Dispenser according to claim 1, wherein the mechanical connection (22) is flexible and that the cover (15) is returned to the closed state by a separate spring.

9. Dispenser according to claim 1, wherein the hinge (23) is arranged in parallel with the longitudinal direction of the elongate body (8).

10. Dispenser according to claim 1, wherein the hinge (23) is arranged perpendicular to the longitudinal direction of the elongate body (8) and at the front of the launch opening (10).

11. Dispenser according to claim 1, wherein the hinge (23) is arranged perpendicular to the longitudinal direction of the elongate body (8) and at the aft of the launch opening (10).

12. Dispenser according to claim 1, wherein the dispenser is adapted to open the cover from a closed state when a countermeasure is being launched and to return the cover back to the closed state after the countermeasure has been launched.

13. A method for launching a countermeasure from a dispenser (2) mounted on an aircraft, wherein:
the countermeasure (5) is arranged in a cartridge (12), where the dispenser comprises a cover (15) arranged in a launch opening (10),
the cover (15) is pivotally suspended on a hinge (23),
a first section (16) of the cover (15) is arranged at a first side of the hinge (23),
a base plate (18) of the dispenser (2) comprises a mounting plate (19), a bottom plate (20) and a resilient means (21) arranged between the mounting plate (19) and the bottom plate (20),
a mechanical connection (22) interconnects the mounting plate (19) with a second section (17) of the cover (15) arranged at a second side of the hinge (23), and
the cover (15), in a closed state, is adapted to close the launch opening (10) such that the cartridges (12) are covered,
the method comprises the step of: opening the cover (15) by the reaction force from the countermeasure (5) when the countermeasure is launched, and
the reaction force compresses the resilient means (21) such that the mechanical connection (22) pulls the cover (15) to an open position.

14. A method according to claim 13, characterized in that the method comprises the step of: closing the cover (15) when the countermeasure (5) has been launched, where the resilient means (21) expands such that the mechanical connection (22) pushes the cover (15) to a closed position.

15. An aircraft comprising at least one dispenser unit according to claim 1.

* * * * *